(12) United States Patent
Elia et al.

(10) Patent No.: US 8,263,517 B2
(45) Date of Patent: Sep. 11, 2012

(54) HYDROPROCESSING CATALYSTS WITH LOW SURFACE AREA BINDERS

(75) Inventors: Christine N. Elia, Bridgewater, NJ (US); Mohan Kalyanaraman, Media, PA (US); Lei Zhang, Vienna, VA (US); Madhav Acharya, Vienna, VA (US); Michael A. Daage, Hellertown, PA (US); Darden Sinclair, Beaumont, TX (US); Jocelyn A. Kowalski, Mullica Hill, NJ (US); Jose G. Santiesteban, Hellertown, PA (US); Ajit B. Dandekar, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 433 days.

(21) Appl. No.: 12/316,978

(22) Filed: Dec. 18, 2008

(65) Prior Publication Data

US 2009/0186754 A1 Jul. 23, 2009

Related U.S. Application Data

(60) Provisional application No. 61/009,376, filed on Dec. 28, 2007.

(51) Int. Cl.
*B01J 29/06* (2006.01)

(52) U.S. Cl. .......................................................... 502/64
(58) Field of Classification Search ........................ None
See application file for complete search history.

(56) References Cited

U.S. PATENT DOCUMENTS

| | | | |
|---|---|---|---|
| 6,833,064 B2 | 12/2004 | Berlowitz et al. | |
| 6,923,949 B1 * | 8/2005 | Lai et al. | 423/709 |
| 2003/0018228 A1 * | 1/2003 | Vaughn et al. | 585/500 |
| 2003/0102254 A1 * | 6/2003 | Eijsbouts et al. | 208/216 R |
| 2005/0040073 A1 * | 2/2005 | Cody et al. | 208/89 |
| 2006/0173228 A1 * | 8/2006 | Chang | 585/638 |

OTHER PUBLICATIONS

U.S. Appl. No. 12/316,977, commonly owned copending application, filed Dec. 18, 2008.
U.S. Appl. No. 12/316,979, commonly owned copending application, filed Dec. 18, 2008.

* cited by examiner

*Primary Examiner* — Emily Le
*Assistant Examiner* — Michael Forrest
(74) *Attorney, Agent, or Firm* — Robert A. Migliorini (57) ABSTRACT

Catalysts for dewaxing of hydrocarbon feeds, particularly feeds with elevated sulfur and nitrogen levels, are provided. The dewaxing catalysts include a zeolite with a low silica to alumina ratio combined with a low surface binder, or alternatively the formulated catalyst has a high ratio of zeolite surface area to external surface area.

17 Claims, 5 Drawing Sheets

FIGURE 5

HYDROPROCESSING CATALYSTS WITH LOW SURFACE AREA BINDERS

This application claims the benefit of U.S. Provisional Application No. 61/009,376 filed Dec. 28, 2007.

FIELD OF THE INVENTION

This invention provides a catalyst and a method of using such a catalyst for processing of high sulfur and/or nitrogen content lubricating oil basestocks.

BACKGROUND OF THE INVENTION

Catalytic dewaxing is now a part of many processes for production of desired hydrocarbon products from basestocks having an appropriate boiling range. Catalytic dewaxing allows for conversion of less desirable molecules within a basestock into molecules with more favorable properties for a particular application. Catalytic dewaxing can be used to improve the properties of basestocks in order to form lubricating oils. Catalytic dewaxing also has applications in other areas, such as improvement of cold flow properties of diesel fuels.

Catalytic dewaxing can occur by either cracking of feedstock molecules or by isomerization of feedstock molecules. Catalysts which perform dewaxing primarily by cracking tend to produce products with lower viscosity index and also tend to have lower yields than catalysts which perform dewaxing primarily by isomerization. As a result, isomerization dewaxing catalysts are preferred in many applications.

Conventional isomerization dewaxing catalysts, however, are susceptible to poisoning by sulfur and nitrogen contaminants in a feedstock. As a result, a hydrotreating step or other pre-treatment step often precedes a catalytic dewaxing step, in order to reduce the sulfur and/or nitrogen in a feedstock. Even with a pre-treatment step to remove sulfur, the susceptibility of dewaxing catalysts to sulfur or nitrogen poisoning limits the types of basestocks that can be processed by catalytic dewaxing. Additionally, if a reactor "upset" occurs, so that feedstock is not processed properly in the pre-treatment step, it may be necessary to replace a dewaxing catalyst exposed to high levels of sulfur or nitrogen.

An alternative for feedstocks containing higher levels of nitrogen and sulfur is to solvent dewax the feedstock. While solvent dewaxing is effective for feedstocks with higher levels of impurities, solvent dewaxing is much more costly than catalytic dewaxing. Thus, a catalytic dewaxing solution for dewaxing of high impurity level feedstocks would be preferred.

SUMMARY OF THE INVENTION

In an embodiment, a supported catalyst is provided that includes a zeolite having a $SiO_2:Al_2O_3$ ratio of 100 or less, a metal hydrogenation component, and a metal oxide binder having a surface area of 100 $m^2/g$ or less in powder form prior to formulation of the supported catalyst. The zeolite and the metal oxide binder are combined to form the supported catalyst.

In another embodiment, a supported catalyst is provided that includes a zeolite having a $SiO_2:Al_2O_3$ ratio of 100 or less, a metal hydrogenation component, and a metal oxide binder. The supported catalyst has a ratio of zeolite surface area to external surface area of at least 80:100.

DETAILED DESCRIPTION OF THE PREFERRED EMBODIMENTS

In various embodiments, the invention provides a catalyst suitable for dewaxing of hydrocarbon feedstocks, including sour feedstocks containing high levels of sulfur and/or nitrogen. The catalysts of the invention provide an activity advantage relative to conventional dewaxing catalysts in the presence of high sulfur or high nitrogen feeds. This advantage is achieved by the use of a zeolite with a low silica to alumina ratio and formulated using a binder having a low surface area. Alternatively, this advantage is achieved by the use of a zeolite with a low silica to alumina ratio and having a high ratio of zeolite surface area to external surface area. The dewaxing catalyst further includes a metal hydrogenation function, such as a Group VIII metal, preferably a Group VIII noble metal. Preferably, the dewaxing catalyst is a unidimensional 10-member ring catalyst, such as ZSM-48 or ZSM-23.

In this invention, it has been unexpectedly found that using a combination of a zeolite with a low ratio of silica to alumina and a binder with a desirable surface area improves the catalytic activity of dewaxing catalysts. In an embodiment, the combination of a zeolite having a sufficiently low silica:alumina ratio with a binder having a low surface area provides the process improvement. In another embodiment, the improvement to catalytic activity is based on providing a formulated catalyst that includes a low silica:alumina ratio zeolite that also has a desirable ratio of external surface area to zeolite surface area.

The external surface area and the zeolite surface area refer to one way of characterizing the total surface area of a catalyst. These surface areas are calculated based on analysis of nitrogen porosimetry data using the BET method for surface area measurement. Previous work has shown that the amount of zeolite content versus binder content in catalyst can be determined from BET measurements. (See, for example, Johnson, M. F. L., Jour. Catal., 52, 425 (1978).) In the discussion below, "external surface area" refers to the surface area that is believed to be attributable to the binder in the catalyst, while the "zeolite surface area" refers to the surface area that is believed to be attributable to the zeolite or other dewaxing catalyst in the BET measurements. One of the advantages of the catalysts according to the invention is that a wide variety of hydrocarbon feedstreams can be processed without harming the functionality and/or performance of the catalyst. Suitable feedstreams for use with the inventive catalysts can be kerosene, diesel, lubricating oil feedstocks, and other distillate feedstreams including wax-containing feedstreams such as feeds derived from crude oils, shale oils, and tar sands. Synthetic feeds such as those derived from the Fischer-Tropsch can also be treated. Typical wax-containing feedstocks for the preparation of lubricating base oils have initial boiling points of about 315° C. or higher, and include feeds such as reduced crudes, hydrocrackates, raffinates, hydrotreated oils, atmospheric gas oils, vacuum gas oils, coker gas oils, atmospheric and vacuum resids, deasphalted oils, slack waxes and Fischer-Tropsch wax. Such feeds may be derived from distillation towers (atmospheric and vacuum), hydrocrackers, hydrotreaters and solvent extraction units, and may have wax contents of up to 50% or more.

Suitable feedstreams can also contain aromatics, such as up to 10 wt % aromatics, or up to 25 wt % aromatics, or up to 50 wt % aromatics.

In another embodiment, an advantage of the inventive catalyst is the ability to maintain catalytic activity in the presence of elevated levels of nitrogen and sulfur. Conventional catalysts often require pre-treatment of a feedstream to reduce the nitrogen content to a few ppm and the sulfur content to less than a few hundred ppm. By contrast, hydrocarbon feedstreams containing up to 0.2 wt. % of nitrogen, based on the feedstream, and up to 3.0 wt. % of sulfur can be effectively processed using the inventive catalysts. In an embodiment, the sulfur content of a feedstream can be at least 0.05 wt % sulfur, or at least 0.1 wt %, or at least 0.5 wt %, or at least 1 wt %, or at least 2 wt %, or at least 3 wt %. In another embodiment, the nitrogen content of the feedstream can be at least 25 wppm, or at least 50 wppm, or at least 100 wppm, or at least 250 wppm, or at least 500 wppm. Sulfur and nitrogen contents may be measured by standard ASTM methods D2622 and D4629, respectively. Preferably, the catalysts according to the invention are zeolites that perform dewaxing primarily by isomerizing a hydrocarbon feedstock. More preferably, the catalysts are zeolites with a unidimensional pore structure. Suitable catalysts include 10-member ring zeolites, such as EU-1, ZSM-35 (or ferrierite), ZSM-11, ZSM-57, NU-87, SAPO-11, and ZSM-22. Preferred materials are EU-2, EU-11, ZBM-30, ZSM-48, or ZSM-23. ZSM-48 and ZSM-23 are more preferred. Note that a zeolite having the ZSM-23 structure with a silica to alumina ratio of from about 20:1 to about 40:1 can sometimes be referred to as SSZ-32. Other molecular sieves that are isostructural with the above materials include Theta-1, NU-10, EU-13, KZ-1, and NU-23. In embodiments where the catalyst is formulated using a low surface area binder, a low surface area binder represents a binder with a surface area of 100 $m^2/g$ or less, or 80 $m^2/g$ or less, or 60 $m^2/g$ or less.

In embodiments where the catalyst has a desired ratio of zeolite surface area to external surface area, the zeolite surface area will be roughly equal to or greater than the external surface area. In an embodiment, the ratio of zeolite surface area to external surface area is at least 80:100, or at least 90:100, or at least 95:100. Preferably, the ratio of zeolite surface area to external surface area is at least 100:100 (or 1:1), or at least 105:100, or at least 110:100, or at least 115:100.

In an embodiment, the silica to alumina ratio in the zeolite is also at a low value. Preferably, the silica to alumina ratio in the zeolite is 100:1 or less, or 85:1 or less, or 75:1 or less, or 70:1 or less. In various embodiments, the amount of silica to alumina corresponding to a "low value" will have some variation. For example, in an embodiment where the zeolite is ZSM-23 (or a structural equivalent), the silica to alumina ratio can be 75:1 or less, or 50:1 or less, or 40:1 or less.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture.

In yet another embodiment, a binder composed of two or more metal oxides can also be used. In such an embodiment, the weight percentage of the low surface area binder is preferably greater than the weight percentage of the higher surface area binder. For example, in a catalyst that is composed of 65 wt % zeolite and 35 wt % of a binder composed of two or more metal oxides, it is preferable to have at least 20 wt % of the lower surface area binder. Alternatively, if both metal oxides used for forming a mixed metal oxide binder have a sufficiently low surface area, the proportions of each metal oxide in the binder are less important. When two or more metal oxides are used to form a binder, the two metal oxides can be incorporated into the catalyst by any convenient method. For example, one binder can be mixed with the zeolite during formation of the zeolite powder, such as during spray drying. The spray dried zeolite/binder powder can then be mixed with the second metal oxide binder prior to extrusion.

Without being bound by any particular theory, it is believed that use of a low surface area binder and/or a formulated catalyst with a high ratio of zeolite surface area to external surface area provides several benefits. It is believed that at least one of the benefits is that catalysts according to the invention allow a greater percentage of metal components to reside on the zeolite portion of the catalyst, as opposed to on the binder. This leads to increased metals levels within the pores of the zeolite, where the metals are protected from some of the sulfur or nitrogen contaminants in a feedstream. Metals that reside on the zeolite portion of the catalyst can either be located on an exposed surface of the zeolite, or the metals can be located within a pore in the zeolite. Due to steric effects, metals within the pores of a 10-member ring zeolite pore will not be exposed to bulky molecules within a feedstream, such as molecules containing aromatic rings. Many of the common molecules within a feedstock that carry sulfur or nitrogen atoms are molecules that also include rings and/or other bulky functional groups. Such molecules cannot readily enter the 10-member ring pores of a zeolite, which therefore protects the metals within the pore from interacting with the sulfur and/or nitrogen contaminants.

Without being bound by any particular theory, a second proposed benefit is that the use of a low surface area binder and/or a formulated catalyst with a high ratio of zeolite surface area to external surface area is believed to increase access to the active sites of the zeolite (e.g. acid sites). Especially for bulky feeds, increased access to zeolite active sites is expected to lead to an overall increase in activity.

In various embodiments, the catalysts according to the invention further include a metal hydrogenation component. The metal hydrogenation component is typically a Group VI and/or a Group VIII metal. Preferably, the metal hydrogenation component is a Group VIII noble metal. More preferably, the metal hydrogenation component is Pt, Pd, or a mixture thereof.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

One example of a dewaxing catalyst suitable for use in the claimed invention is ZSM-48 with a $SiO_2:Al_2O_3$ ratio of less than 10, preferably from about 70 to about 10. In the embodiments below, ZSM-48 crystals will be described variously in terms of "as-synthesized" crystals that still contain the organic template; calcined crystals, such as Na-form ZSM-48 crystals; or calcined and ion-exchanged crystals, such as H-form ZSM-48 crystals.

The ZSM-48 crystals after removal of the structural directing agent have a particular morphology and a molar composition according to the general formula:

$$(n)SiO_2:Al_2O_3$$

where n is from 70 to 110, preferably 80 to 100, more preferably 85 to 95. In another embodiment, n is at least 70, or at least 80, or at least 85. In yet another embodiment, n is 110 or less, or 100 or less, or 95 or less. In still other embodiments, Si may be replaced by Ge and Al may be replaced by Ga, B, Fe, Ti, V, and Zr.

The as-synthesized form of ZSM-48 crystals is prepared from a mixture having silica, alumina, base and hexamethonium salt directing agent. In an embodiment, the molar ratio of structural directing agent:silica in the mixture is less than 0.05, or less than 0.025, or less than 0.022. In another embodiment, the molar ratio of structural directing agent:silica in the mixture is at least 0.01, or at least 0.015, or at least 0.016. In still another embodiment, the molar ratio of structural directing agent:silica in the mixture is from 0.015 to 0.025, preferably 0.016 to 0.022. In an embodiment, the as-synthesized form of ZSM-48 crystals has a silica:alumina molar ratio of 70 to 110. In still another embodiment, the as-synthesized form of ZSM-48 crystals has a silica:alumina molar ratio of at least 70, or at least 80, or at least 85. In yet another embodiment, the as-synthesized form of ZSM-48 crystals has a silica:alumina molar ratio of 110 or less, or 100 or less, or 95 or less. For any given preparation of the as-synthesized form of ZSM-48 crystals, the molar composition will contain silica, alumina and directing agent. It should be noted that the as-synthesized form of ZSM-48 crystals may have molar ratios slightly different from the molar ratios of reactants of the reaction mixture used to prepare the as-synthesized form. This result may occur due to incomplete incorporation of 100% of the reactants of the reaction mixture into the crystals formed (from the reaction mixture).

The ZSM-48 zeolite in either a calcined or as-synthesized form typically forms agglomerates of small crystals that may have crystal sizes in the range of about 0.01 to about 1 μm. These small crystals are desirable for they generally lead to greater activity. Smaller crystals mean greater surface area which leads to a greater number of active catalytic sites per given amount of catalyst. Preferably, the ZSM-48 crystals in either a calcined or as-synthesized form have a morphology containing no fibrous crystals. By fibrous is meant crystals that have a L/D ratio of >10/1, where L and D represent the length and diameter of the crystal. In another embodiment, the ZSM-48 crystals in either a calcined or as-synthesized form have a low quantity or are free of needle-like crystals. By needle-like is meant crystals that have a L/D ratio of <10/1, preferably less than 5/1, more preferably between 3/1 and 5/1. The SEM shows that crystals prepared according to the methods herein have no detectable crystals having a fibrous or needle-like morphology. This morphology alone or coupled with the low silica:alumina ratios leads to catalysts having high activity as well as desirable environmental features. The ZSM-48 composition is prepared from an aqueous reaction mixture comprising silica or silicate salt, alumina or soluble aluminate salt, base and directing agent. To achieve the desired crystal morphology, the reactants in reaction mixture have the following molar ratios:

SiO$_2$:Al$_2$O$_3$=70 to 110
H$_2$O:SiO$_2$=1 to 500
OH$^-$:SiO$_2$=0.1 to 0.3
OH$^-$:SiO$_2$ (preferred)=0.14 to 0.18
template:SiO$_2$=0.01-0.05
template:SiO$_2$ (preferred)=0.015 to 0.025

In the above ratios, two ranges are provided for both the base:silica ratio and the structure directing agent:silica ratio. The broader ranges for these ratios include mixtures that result in the formation of ZSM-48 crystals with some quantity of Kenyaite and/or needle-like morphology. For situations where Kenyaite and/or needle-like morphology is not desired, the preferred ranges should be used, as is further illustrated below in the Examples.

The silica source is preferably precipitated silica and is commercially available from Degussa. Other silica sources include powdered silica including precipitated silica such as Zeosil® and silica gels, silicic acid colloidal silica such as Ludox® or dissolved silica. In the presence of a base, these other silica sources may form silicates. The alumina may be in the form of a soluble salt, preferably the sodium salt and is commercially available from US Aluminate. Other suitable aluminum sources include other aluminum salts such as the chloride, aluminum alcoholates or hydrated alumina such as gamma alumina, pseudobohemite and colloidal alumina. The base used to dissolve the metal oxide can be any alkali metal hydroxide, preferably sodium or potassium hydroxide, ammonium hydroxide, diquaternary hydroxide and the like. The directing agent is a hexamethonium salt such as hexamethonium dichloride or hexamethonium hydroxide. The anion (other than chloride) could be other anions such as hydroxide, nitrate, sulfate, other halide and the like. Hexamethonium dichloride is N,N,N,N',N',N'-hexamethyl-1,6-hexanediammonium dichloride.

In an embodiment, the crystals obtained from the synthesis according to the invention have a morphology that is free of fibrous morphology. Fibrous morphology is not desired, as this crystal morphology inhibits the catalytic dewaxing activity of ZSM-48. In another embodiment, the crystals obtained from the synthesis according to the invention have a morphology that contains a low percentage of needle-like morphology. The amount of needle-like morphology present in the ZSM-48 crystals can be 10% or less, or 5% or less, or 1% or less. In an alternative embodiment, the ZSM-48 crystals can be free of needle-like morphology. Low amounts of needle-like crystals are preferred for some applications as needle-like crystals are believed to reduce the activity of ZSM-48 for some types of reactions. To obtain a desired morphology in high purity, the ratios of silica:alumina, base:silica and directing agent:silica in the reaction mixture according to embodiments of the invention should be employed. Additionally, if a composition free of Kenyaite and/or free of needle-like morphology is desired, the preferred ranges should be used.

The as-synthesized ZSM-48 crystals should be at least partially dried prior to use or further treatment. Drying may be accomplished by heating at temperatures of from 100 to 400° C., preferably from 100 to 250° C. Pressures may be atmospheric or subatmospheric. If drying is performed under partial vacuum conditions, the temperatures may be lower than those at atmospheric pressures.

Catalysts are typically bound with a binder or matrix material prior to use. Binders are resistant to temperatures of the use desired and are attrition resistant. Binders may be catalytically active or inactive and include other zeolites, other inorganic materials such as clays and metal oxides such as alumina, silica, titania, zirconia, and silica-alumina. Clays may be kaolin, bentonite and montmorillonite and are commercially available. They may be blended with other materials such as silicates. Other porous matrix materials in addition to silica-aluminas include other binary materials such as silica-magnesia, silica-thoria, silica-zirconia, silica-beryllia and silica-titania as well as ternary materials such as silica-alumina-magnesia, silica-alumina-thoria and silica-aluminazirconia. The matrix can be in the form of a co-gel. The bound ZSM-48 may range from 10 to 100 wt. % ZSM-48, based on bound ZSM-48 with the balance being binder.

ZSM-48 crystals as part of a catalyst may also be used with a metal hydrogenation component. Metal hydrogenation components may be from Groups 6-12 of the Periodic Table based on the IUPAC system having Groups 1-18, preferably Groups 6 and 8-10. Examples of such metals include Ni, Mo, Co, W, Mn, Cu, Zn, Ru, Pt or Pd, preferably Pt or Pd. Mixtures of hydrogenation metals may also be used such as Co/Mo, Ni/Mo, Ni/W and Pt/Pd, preferably Pt/Pd. The amount of hydrogenation metal or metals may range from 0.1 to 5 wt. %, based on catalyst. In an embodiment, the amount of metal or metals is at least 0.1 wt %, or at least 0.25 wt %, or at least 0.5 wt %, or at least 0.6 wt %, or at least 0.75 wt %. In another embodiment, the amount of metal or metals is 5 wt % or less, or 4 wt % or less, or 3 wt % or less, or 2 wt % or less, or 1 wt % or less. Methods of loading metal onto ZSM-48 catalyst are well known and include, for example, impregnation of ZSM-48 catalyst with a metal salt of the hydrogenation component and heating. The ZSM-48 catalyst containing hydrogenation metal may also be sulfided prior to use. The catalyst may also be steamed prior to use.

High purity ZSM-48 crystals made according to the above embodiments have a relatively low silica:alumina ratio. This lower silica:alumina ratio mean that the present catalysts are more acidic. In spite of this increased acidity, they have superior activity and selectivity as well as excellent yields. They also have environmental benefits from the standpoint of health effects from crystal form and the small crystal size is also beneficial to catalyst activity.

For catalysts according to the invention that incorporate ZSM-23, any suitable method for producing ZSM-23 with a low $SiO_2:Al_2O_3$ ratio may be used. U.S. Pat. No. 5,332,566 provides an example of a synthesis method suitable for producing ZSM-23 with a low ratio of $SiO_2:Al_2O_3$. For example, a directing agent suitable for preparing ZSM-23 can be formed by methylating iminobispropylamine with an excess of iodomethane. The methylation is achieved by adding the iodomethane dropwise to iminobispropylamine which is solvated in absolute ethanol. The mixture is heated to a reflux temperature of 77° C. for 18 hours. The resulting solid product is filtered and washed with absolute ethanol.

The directing agent produced by the above method can then be mixed with colloidal silica sol (30% $SiO_2$), a source of alumina, a source of alkali cations (such as Na or K), and deionized water to form a hydrogel. The alumina source can be any convenient source, such as alumina sulfate or sodium aluminate. The solution is then heated to a crystallization temperature, such as 170° C., and the resulting ZSM-23 crystals are dried. The ZSM-23 crystals can then be combined with a low surface area binder to form a catalyst according to the invention.

Example 1

0.6 wt % Pt(IW) on 65/35 ZSM-48(90/1)/$TiO_2$

65% ZSM-48(90/1) and 35% Titania were extruded to a 1/16" quadrulobe. The extrudate was pre-calcined in $N_2$ @1000° F., ammonium exchanged with 1N ammonium nitrate, and then dried at 250° F., followed by calcination in air at 1000° F. The extrudate was then was loaded with 0.6 wt % Pt by incipient wetness impregnation with platinum tetraammine nitrate, dried at 250° F., and calcined in air at 680° F. for 3 hours. Table 1 provides the surface area of the extrudate via $N_2$ porosimetry.

A batch micro-autoclave system was used to determine the activity of the above catalyst. The catalyst was reduced under hydrogen followed by the addition of 2.5 grams of a 130N feed (cloud point 31). The reaction was run at 400 psig at 330° C. for 12 hours. Cloud points were determined for two feed space velocities. Results are provided in Table 2.

Example 2

0.6 wt % Pt(IW) on 65/35 ZSM-48(90/1)/$Al_2O_3$
(Comparative)

65% ZSM-48(90/1) and 35% $Al_2O_3$ were extruded to a 1/16" quadrulobe. The extrudate was pre-calcined in $N_2$ @1000° F., ammonium exchanged with 1N ammonium nitrate, and then dried at 250° F. followed by calcination in air at 1000° F. The extrudate was then steamed (3 hours at 890° F.). The extrudate was then loaded with 0.6 wt % Pt by incipient wetness impregnation with platinum tetraammine nitrate, dried at 250° F., and calcined in air at 680° F. for 3 hours. Table 1 provides the surface area of the extrudate via $N_2$ porosimetry.

A batch micro-autoclave system was used to determine the activity of the above catalyst. The catalyst was reduced under hydrogen followed by the addition of 2.5 grams of a 130N feed. The reaction was run at 400 psig at 330° C. for 12 hours. Cloud points were determined for two feed space velocities. Results are provided in Table 2.

Example 3

0.6 wt % Pt(IW) on 80/20 ZSM-48(90/1)/$SiO_2$

80% ZSM-48(90/1) and 20% $SiO_2$ were extruded to 1/16" quadrulobe. The extrudate was pre-calcined in $N_2$ @1000° F., ammonium exchanged with 1N ammonium nitrate, and then dried at 250° F. followed by calcination in air at 1000° F. The extrudate was then loaded with 0.6 wt % Pt by incipient wetness impregnation with platinum tetraammine nitrate, dried at 250° F., and calcined in air at 680° F. for 3 hours. Table 1 provides the surface area of the extrudate via $N_2$ porosimetry.

A batch micro-autoclave system was used to determine the activity of the above catalyst. The catalyst was reduced under hydrogen followed by the addition of 2.5 grams 130N. The reaction was run at 400 psig at 330° C. for 12 hours. Cloud points were determined for two feed space velocities. Results are provided in Table 2.

Example 4

0.6 wt % Pt(IW) on 65/35
ZSM-48(90/1)/Theta-Alumina

Pseudobohemite alumina was calcined at 1000° C. to convert it to a lower surface area theta phase, as compared to the gamma phase alumina used as the binder in Example 2 above. 65% of ZSM-48(90/1) and 35% of the calcined alumina were extruded with 0.25% PVA to 1/16" quadrulobes. The extrudate was pre-calcined in $N_2$ at 950° F., ammonium exchanged with 1N ammonium nitrate, and then dried at 250° F. followed by calcination in air at 1000° F. The extrudate was then loaded with 0.6 wt % Pt by incipient wetness impregnation with platinum tetraammine nitrate, dried at 250° F., and calcined in air at 680° F. for 3 hours. Table I provides the surface area of the extrudate via $N_2$ porosimetry.

A batch micro-autoclave system was used to determine the activity of the above catalyst. The catalyst was reduced under hydrogen followed by the addition of 2.5 grams 130N. The reaction was run at 400 psig at 330° C. for 12 hours. Cloud points were determined for two feed space velocities. Results are provided in Table 2.

Example 5

0.6 wt % Pt(IW) on 65/35 ZSM-48(90/1)/Zirconia

65% ZSM-48(90/1) and 35% Zirconia were extruded to a 1/16" quadrulobe. The extrudate was pre-calcined in $N_2$ @1000° F., ammonium exchanged with 1N ammonium nitrate, and then dried at 250° F. followed by calcination in air at 1000° F. The extrudate was then was loaded with 0.6 wt % Pt by incipient wetness impregnation with platinum tetraammine nitrate, dried at 250° F., and calcined in air at 680° F. for 3 hours. Table I provides the surface area of the extrudate via $N_2$ porosimetry.

A batch micro-autoclave system was used to determine the activity of the above catalyst. The catalyst was reduced under hydrogen followed by the addition of 2.5 grams 130N. The reaction was run at 400 psig at 330° C. for 12 hours. Cloud points were determined for two feed space velocities. Results are provided in Table 2.

TABLE 1

| Example | | BET SA ($m^2/g$) | Zeolite SA ($m^2/g$) | External SA ($m^2/g$) |
|---|---|---|---|---|
| 1 | 0.6% Pt on 65/35 ZSM-48 (90/1)/Titania | 200 | 95 | 104 |
| 2 | 0.6% Pt on 65/35 ZSM-48 (90/1)/$Al_2O_3$ | 232 | 50 | 182 |
| 3 | 0.6% Pt on 80/20 ZSM-48 (90/1)/Silica | 211 | 114 | 97 |
| 4 | 0.6% Pt on 65/35 ZSM-48 (90/1)/Theta-alumina | 238 | 117 | 121 |
| 5 | 0.6% Pt on 65/35 ZSM-48 (90/1)/Zirconia | 225 | 128 | 97 |

Table 1 shows that the catalysts from Examples 1, 3, 4, and 5 all have an zeolite surface area that is at least roughly comparable to the external surface area.

TABLE 2

| | WHSV | Cloud Point (° C.) |
|---|---|---|
| 1 | 0.71 | −45* |
| 1 | 1.03 | −35 |
| 2 | 0.75 | −26 |
| 2 | N/A | N/A |
| 3 | 0.71 | −45* |
| 3 | 1.01 | −28 |
| 4 | 0.73 | −45* |
| 4 | 1.03 | −12 |
| 5 | 0.73 | −45* |
| 5 | 0.99 | −45* |

Note that in Table 2, a value of −45° C. represents the low end of the measurement range for the instrument used to measure the cloud point. Cloud point measurements indicated with an asterisk are believed to represent the detection limit of the instrument, rather than the actual cloud point value of the processed feed. As shown in Table 2, all of the catalysts with an zeolite surface area that is at least roughly comparable to the external surface area produced a product with the lowest detectable cloud point at a space velocity near 0.75. By contrast, the catalyst from Example 2, with the higher external surface area, produced a cloud point of only −26 for a space velocity near 0.75. Note that the alumina used to form the catalyst in Example 2 also corresponds to high surface area binder. At the higher space velocity of about 1.0, all of the low surface area binder catalysts also produced good results.

Example 6

Hydrodewaxing Catalysts with High Silica to Alumina Ratios (Comparative)

Additional catalyst evaluations were carried out on comparative catalysts having a zeolite with a high silica to alumina ratio. A catalyst of 0.6 wt % Pt on 65/35 ZSM-48(180/1)/$TiO_2$ was prepared according to the following procedure. A corresponding sample was also prepared using $Al_2O_3$ instead of $TiO_2$, which produced a catalyst of 0.6 wt % Pt on 65/35 ZSM-48 (180/1)/$Al_2O_3$.

An extrudate consisting of 65% (180/1 Si/$Al_2$) ZSM-48 and 35% Titania (50 grams) was loaded with 0.6 wt % Pt by incipient wetness impregnation with platinum tetraammine nitrate, dried at 250° F. and calcined in full air at 680° F. for 3 hours. As shown above in Table 1, the $TiO_2$ binder provides a formulated catalyst with a high ratio of zeolite surface area to external surface area. The $TiO_2$ binder also provides a lower acidity than an $Al_2O_3$ binder.

The above two catalysts were used for hydrodewaxing experiments on a multi-component model compound system designed to model a 130N raffinate. The multi-component model feed was made of 40% n-hexadecane in a decalin solvent with 0.5% dibenzothiophene (DBT) and 100 ppm N in quinoline added (bulky S, N species to monitor HDS/HDN). The feed system was designed to simulate a real waxy feed composition.

Hydrodewaxing studies were performed using a continuous catalyst testing unit composed of a liquid feed system with an ISCO syringe pump, a fixed-bed tubular reactor with a three-zone furnace, liquid product collection, and an on-line MTI GC for gas analysis. Typically, 10 cc of catalyst was sized and charged in a down-flow 3/8" stainless steel reactor containing a 1/8" thermowell. After the unit was pressure tested, the catalyst was dried at 300° C. for 2 hours with 250 cc/min $N_2$ at ambient pressure. The catalysts were then reduced by hydrogen reduction. Upon completion of the catalyst treatment, the reactor was cooled to 150° C., the unit pressure was set to 600 psig by adjusting a back-pressure regulator and the gas flow was switched from $N_2$ to $H_2$. Liquid feedstock was introduced into the reactor at 1 liquid hourly space velocity (LHSV). Once the liquid feed reached the downstream knockout pot, the reactor temperature was increased to the target value. A material balance was initiated until the unit was lined out for 6 hours. The total liquid product was collected in the material balance dropout pot and analyzed by an HP 5880 gas chromatograph (GC) with FID. The detailed aromatic component conversion and products were identified and calculated by GC analysis. Gas samples were analyzed with an on-line HP MTI GC equipped with both TCD and FID detectors. A series of runs were performed to understand catalyst activity/product properties as function of process temperature.

All catalysts were loaded in an amount of 10 cc in the reactor and were evaluated using the operating procedure described in Example 8 at the following conditions: T=270-380° C., P=600 psig, liquid rate=10 cc/hr, $H_2$ circulation rate=2500 scf/bbl, and LHSV=1 $hr^{-1}$.

Figure 1:
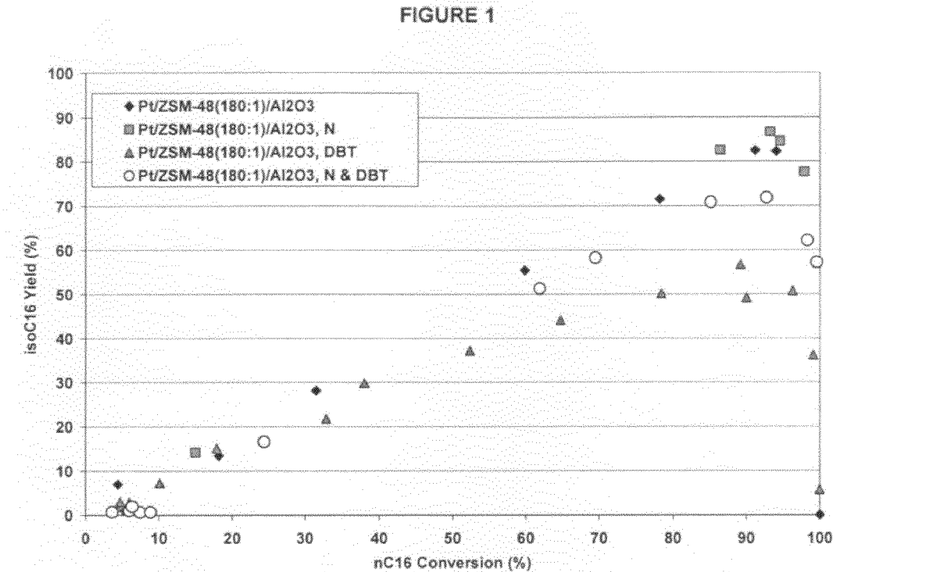
FIGS. 1 and 2 show the activity of comparative catalysts.
Figure 2:
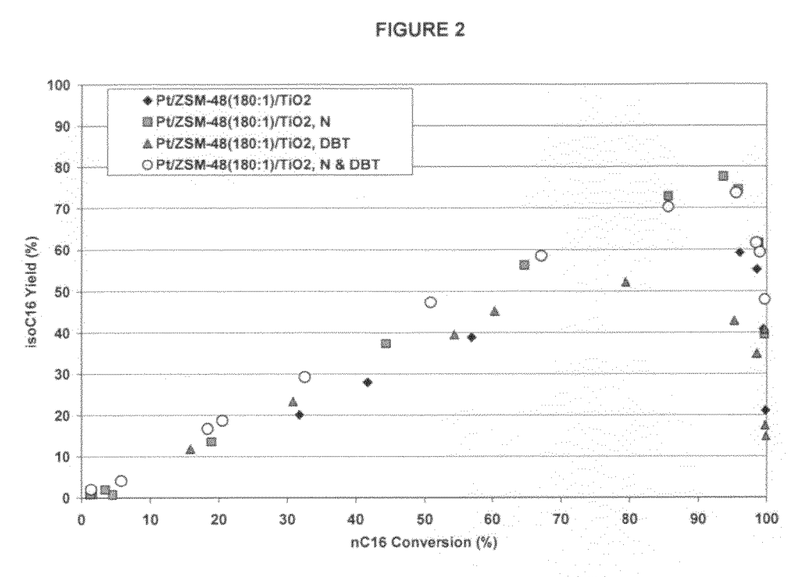

The n-hexadecane ($nC_{16}$) isomerization activity and yield are summarized in FIGS. 1 and 2. FIG. 1 shows the relationship between $nC_{16}$ conversion and iso-$C_{16}$ yield for a clean feed and spiked feeds for the alumina bound (higher surface area) catalyst. FIG. 2 shows similar relationships for the titania bound (lower surface area) catalyst. In general, the catalysts with higher and lower surface area binders show similar conversion efficiency. The low surface area catalyst (FIG. 2) has slightly lower conversion efficiencies relative to yield as compared to the higher surface area catalyst. For each of these feeds, the temperatures needed to achieve a given $nC_{16}$ conversion level were similar for the two types of catalyst.

FIGS. 1 and 2 demonstrate that the advantages of the claimed invention cannot be achieved simply by using a low surface area binder with any dewaxing catalyst. When exposed to a clean feed or a feed containing one or more of sulfur and nitrogen, the dewaxing catalyst with a high silica to alumina ratio showed similar, or possibly even reduced activity when formulated with a low surface area binder relative to a higher surface area binder.

Example 7

Hydrodewaxing Over 0.6 wt % Pt on 65/35 ZSM-48(90/1)/$TiO_2$ Using 130N Feed

This example illustrates the catalytic performance of 0.6 wt % Pt on 65/35 ZSM-48(90/1)/$TiO_2$ versus a corresponding alumina-bound (higher external surface area) catalyst using 130N raffinate.

An extrudate consisting of 65% (90/1 Si/$Al_2$) ZSM-48 and 35% Titania (30 grams) was loaded with 0.6 wt % Pt by incipient wetness impregnation with platinum tetraammine nitrate, dried at 250° F. and calcined in full air at 680° F. for 3 hours. A corresponding sample was also prepared using $Al_2O_3$ instead of $TiO_2$.

The catalysts were loaded in a 10 cc amount in the reactor and were evaluated using the operating procedure described in Example 6 at the following conditions: T=330-380° C., P=400 psig, liquid rate=5 cc/hr, $H_2$ circulation rate=5000 scf/bbl, and LHSV=0.5 $hr^{-1}$. The catalysts were exposed to the 130N raffinate which contained 66 wppm N and 0.63 wt % S.

Figure 3:
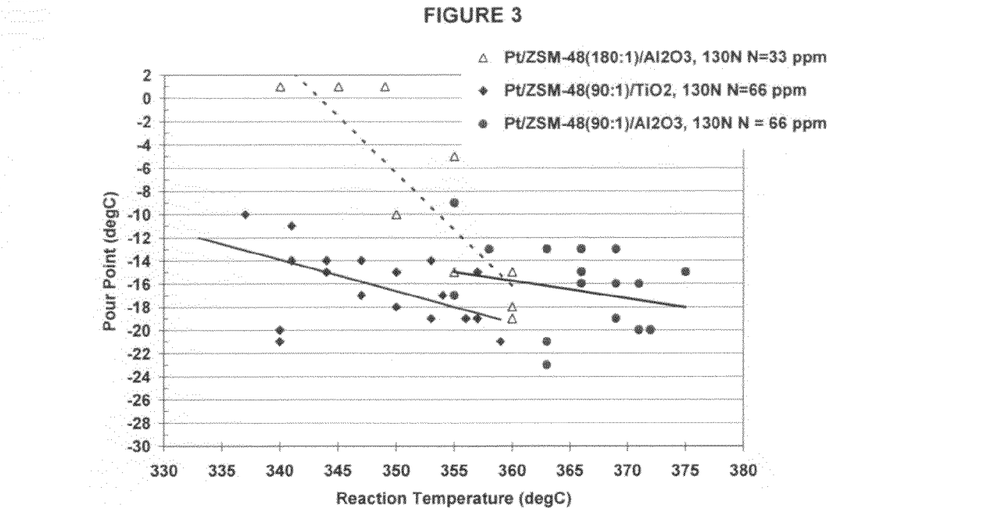
FIG. 3 shows the correlation between hydroprocessing temperature and pour point for various catalysts.

FIG. 3 shows the relative catalyst activity of the 0.6 wt % Pt on 65/35 ZSM-48(90/1)/$TiO_2$ catalyst and the corresponding alumina bound catalyst. For the 130N raffinate feed, compared with the corresponding alumina bound catalyst, the 0.6 wt % Pt on 65/35 ZSM-48(90/1)/$TiO_2$ catalyst showed a 20° C. temperature advantage (i.e. more active at 20° C. lower temp) at the given product pour point. Note that FIG. 3 also shows data for a 130N raffinate feed with half the nitrogen content that was hydroprocessed using 65/35 ZSM-48 (180/1)/$Al_2O_3$ with 0.6 wt % Pt. (This is the alumina bound catalyst from Example 6.) Even at twice the nitrogen content, the lower surface area 65/35 ZSM-48(90/1)/$TiO_2$ with 0.6 wt % Pt catalyst achieved a substantial activity credit.

Figure 4:
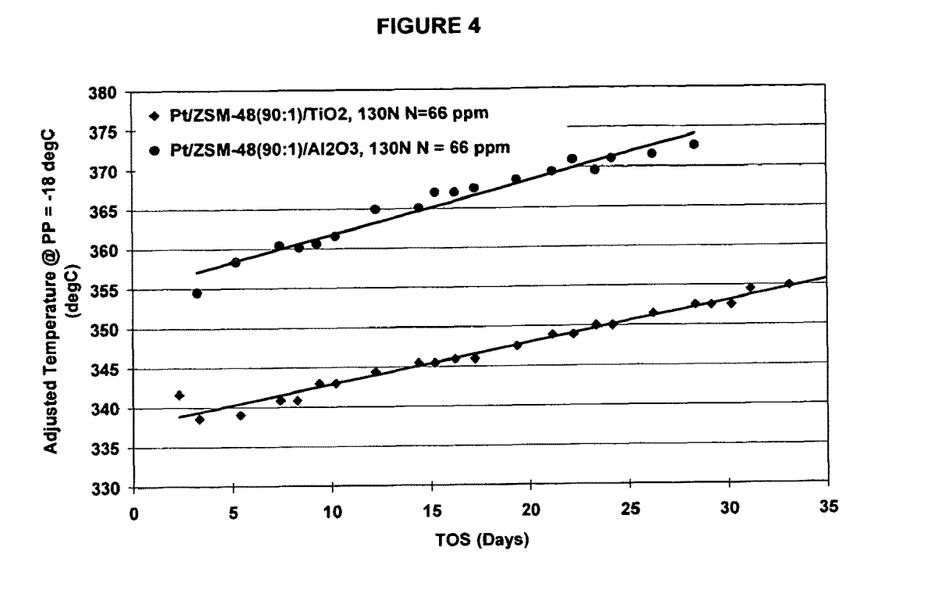
FIG. 4 shows an aging rate for various catalysts.

To further demonstrate the benefit of the low surface area, low silica to alumina ratio catalyst, FIG. 4 shows a TIR plot for the 0.6 wt % Pt on 65/35 ZSM-48(90/1)/$TiO_2$ catalyst and the corresponding alumina-bound catalyst. The TIR plot shows that the aging rate for the 0.6 wt % Pt on 65/35 ZSM-48(90/1)/$TiO_2$ catalyst was 0.624° C./day compared to 0.69° C./day for the corresponding alumina-bound catalyst. Thus, when exposed to a nitrogen rich feed, the low surface area and low silica to alumina ratio catalyst provides both improved activity and longer activity lifetime.

Figure 5:
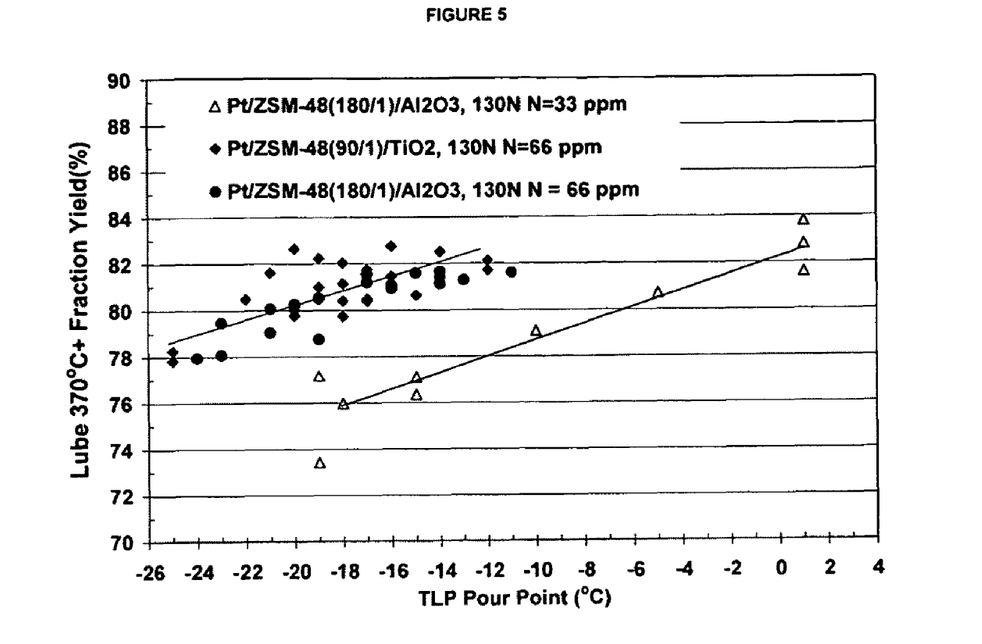
FIG. 5 shows the hydroprocessing product yield for various catalysts.

FIG. 5 provides the lubricant yield for the 0.6 wt % Pt on 65/35 ZSM-48(90/1)/$TiO_2$ catalyst and the two alumina bound catalysts shown in FIG. 3. The 0.6 wt % Pt on 65/35 ZSM-48(90/1)/$TiO_2$ provides the same lubricant yield as the corresponding alumina-bound (higher surface area) catalyst. The VI versus pour point relationships for the lower and higher surface area catalysts are also similar. Note that both the 0.6 wt % Pt on 65/35 ZSM-48(90/1)/$TiO_2$ catalyst and the corresponding alumina catalyst provided an improved pour point versus yield relationship as compared to the higher silica to alumina ratio catalyst.

Example 8

Mixed Binder Systems

This example illustrates that the advantage of a low surface area binder can be realized for mixed binder systems, where a majority of the binder is a low surface area binder.

An extrudate consisting of 65% (90/1 Si/$Al_2$) ZSM-48 and 35% of a mixed binder was loaded with 0.6 wt % Pt by incipient wetness impregnation with platinum tetraammine nitrate, dried at 250° F. and calcined in full air at 680° F. for 3 hours. The 35 wt % binder in the extrudate was composed of 20 wt % alumina (higher surface area) and 15 wt % titania (lower surface area).

A second extrudate consisting of 65% (90/1 Si/$Al_2$) ZSM-48 and 35% of a mixed binder was also loaded with 0.6 wt % Pt by incipient wetness impregnation with platinum tetraammine nitrate, dried at 250° F. and calcined in full air at 680° F. for 3 hours. In the second extrudate, the 35 wt % of binder was composed of 25 wt % titania (lower surface area) and 10 wt % alumina (higher surface area).

The activity of the above catalysts was tested in a batch micro-autoclave system. For the catalyst with a binder of 20 wt % alumina and 15 wt % titania, 208.90 mg and 71.19 mg of catalyst were loaded in separate wells and reduced under hydrogen, followed by the addition of 2.5 grams of a 600N feedstock. (The 600N feedstock had similar N and S levels to the 130N feed.)

The "space velocity" was 1.04 and 3.03 respectively. The reaction was run at 400 psig at 345° C. for 12 hours. The resulting cloud point of the total liquid product was −18° C. at 1.03 WHSV and 21° C. at 3.09 WHSV. For the catalyst with a binder of 25 wt % titania and 10 wt % alumina, 212.57 mg and 69.75 mg of catalyst were loaded in separate wells and reduced under hydrogen, followed by the addition of 2.5 grams of a 600N feedstock. (The 600N feedstock had similar N and S levels to the 130N feed.)

The "space velocity" was 1.02 and 3.10 respectively. The reaction was run at 400 psig at 345° C. for 12 hours. The resulting cloud point of the total liquid product was −45° C. (detection limit of cloud point instrument) at 1.03 WHSV and 3° C. at 3.09 WHSV.

The above activity tests parallel the results from Examples 1 to 5 above. The catalyst containing a binder composed of a majority of high surface area binder behaved similarly to the catalyst with high surface area binder in Example 2. The catalyst with a majority of low surface area binder resulted in a much more active catalyst, as seen in Examples 1 and 3-5 above.

What is claimed is:

1. A supported catalyst comprising:
    a zeolite having unidimensional 10-member ring pores and a $SiO_2$:$Al_2O_3$ ratio of 100 or less;
    0.1 to 5 wt.% of a metal hydrogenation component; and a metal oxide binder, wherein the metal oxide binder in powder form has a surface area of 80 m²/g or less;

wherein the supported catalyst has a ratio of zeolite surface area to external surface area of at least 80:100.

2. The supported catalyst of claim 1, wherein the zeolite is EU-1, ZSM-35, ZSM-11, ZSM-57, NU-87, ZSM-22, EU-2, EU-11, ZBM-30, ZSM-48, ZSM-23, or a combination thereof.

3. The supported catalyst of claim 2, wherein the zeolite is EU-2, EU-11, ZBM-30, ZSM-48, ZSM-23, or a combination thereof.

4. The supported catalyst of claim 2, wherein the zeolite is ZSM-48, ZSM-23, or a combination thereof.

5. The supported catalyst of claim 2, wherein the zeolite is ZSM-48.

6. The supported catalyst of claim 1, wherein the ratio of $SiO_2:Al_2O_3$ is 80 or less.

7. The supported catalyst of claim 1, wherein the ratio of $SiO_2:Al_2O_3$ is 75 or less.

8. The supported catalyst of claim 1, wherein the ratio of $SiO_2:Al_2O_3$ is 60 or less.

9. The supported catalyst of claim 1, wherein the metal oxide binder has a surface area of 60 m²/g or less.

10. The supported catalyst of claim 1, wherein the supported catalyst has a ratio of zeolite surface area to external surface area of at least 90:100.

11. The supported catalyst of claim 1, wherein the supported catalyst has a ratio of zeolite surface area to external surface area of at least 1:1.

12. The supported catalyst of claim 1, wherein the supported catalyst has a ratio of zeolite surface area to external surface area of at least 105:100.

13. The supported catalyst of claim 1, wherein the binder is silica, alumina, titania, zirconia, or silica-alumina.

14. The supported catalyst of claim 1, wherein the binder further comprises a second metal oxide different from the first metal oxide.

15. The supported catalyst of claim 14, wherein the second metal oxide is an silica, alumina, titania, zirconia, or silica-alumina.

16. The supported catalyst of claim 1, wherein the metal hydrogenation component is a Group VIII noble metal.

17. The supported catalyst of claim 16, wherein the metal hydrogenation component is Pt, Pd, or a combination thereof.

* * * * *